United States Patent [19]
Maass et al.

[11] Patent Number: 5,187,426
[45] Date of Patent: Feb. 16, 1993

[54] DEVICE FOR LIMITING THE TERMINAL VOLTAGE IN AN ALTERNATOR

[75] Inventors: Manfred Maass; Joachim Bunke, both of Esslingen; Martin Fritz, Rudersberg, all of Fed. Rep. of Germany

[73] Assignee: Mercedes-Benz AG, Stuttgart, Fed. Rep. of Germany

[21] Appl. No.: 686,375

[22] Filed: Apr. 17, 1991

[30] Foreign Application Priority Data

May 23, 1990 [DE] Fed. Rep. of Germany ....... 4016573

[51] Int. Cl.$^5$ .............................................. H02P 9/10
[52] U.S. Cl. ........................................ 322/63; 322/28
[58] Field of Search ....................... 322/21, 28, 59, 63, 322/64, 66, 89; 310/112, 178, 183, 184, 188

[56] References Cited

U.S. PATENT DOCUMENTS

| | | | |
|---|---|---|---|
| 3,718,849 | 2/1973 | Nolan et al. | 322/28 X |
| 3,943,408 | 3/1976 | Jakobs et al. | 322/28 X |
| 4,105,963 | 8/1978 | Dobranis | 322/63 X |
| 4,633,160 | 12/1986 | Graham | 322/63 X |
| 4,733,157 | 3/1988 | Malesani | 322/28 |
| 4,887,020 | 12/1989 | Graham | 322/63 |

FOREIGN PATENT DOCUMENTS

| | | |
|---|---|---|
| 947490 | 7/1956 | Fed. Rep. of Germany . |
| 2132719 | 1/1973 | Fed. Rep. of Germany . |
| 3116315 | 11/1982 | Fed. Rep. of Germany . |
| 1477358 | 4/1967 | France . |

Primary Examiner—Emanuel T. Voeltz
Assistant Examiner—Kristine Peckman
Attorney, Agent, or Firm—Evenson, Wands, Edwards, Lenahan & McKeown

[57] ABSTRACT

An arrangement for limiting the terminal voltage in an alternator has a fixed stator winding acting on rectifiers and an excitation winding which rotates with the alternator rotor. The arrangement also has a controller and a first slip ring contact which load the excitation winding with excitation current as a function of the magnitude of a delivered voltage, and at least one free-wheeling valve which is conductive during a controller-side interruption of the excitation current and is connected in parallel with the excitation winding. The arrangement includes an auxiliary winding on the rotor. The auxiliary winding continues the excitation winding in the same direction of winding, with the auxiliary winding and the excitation winding being connected at a first connection point. A second slip ring contact operatively connects the first connection point to a machine terminal supplying excitation current. A zener diode is connected in series with auxiliary winding, and a third slip ring contact operatively connects the auxiliary winding to a ground terminal of the alternator or of the controller.

14 Claims, 3 Drawing Sheets

DEVICE FOR LIMITING THE TERMINAL VOLTAGE IN AN ALTERNATOR

BACKGROUND AND SUMMARY OF THE INVENTION

The present invention relates to an arrangement for limiting the terminal voltage in an alternator. The alternator has a fixed stator winding acting on rectifiers, an excitation winding which rotates with the alternator rotor, a controller and a first slip ring contact which load the excitation winding with excitation current as a function of the magnitude of a delivered voltage. The alternator has at least one free-wheeling valve which is conductive during a controller-side interruption of the excitation current and is connected in parallel with the excitation winding.

It is known that only alternators with integrated rectifier stacks are used in motor vehicles. Electronic controllers for influencing the excitation current are frequently also an accompanying integrated alternator component.

According to FIG. 1, which shows a conventional arrangement, the stator winding 1, usually provided with star connection, acts on the negative pole B− of the vehicle battery (vehicle ground) via a first half and on the positive pole B+ of the battery via a second half of a 6-valve three-phase rectifier bridge 2. There is also a further bridge half 3 via which the stator winding acts, also with positive poling in relation to the vehicle ground, on a separate adjacent terminal D+. A controller 4 receives its operating power from the terminal D+. The controller 4 supplies the rotating excitation coil 5 with current in accordance with the voltage delivered at the terminal D+.

It is known that this robust configuration offers a series of advantages in comparison with dynamos, namely small size and weight, in particular with respect to power delivery, good charging current yield even at a low engine speed, easy radio shielding, low maintenance requirements and a long service life.

There is an inherent disadvantage of such dynamos, however, which arises in the case of sudden load dumping, for example the accidental disconnection of the battery terminal when the engine is running or the presence of a loose contact in the main current path. This disadvantage is that, for a brief time, a high voltage is delivered into the vehicle electrical system which can irreparably destroy electronic equipment subjected to this voltage or electronically driven loads (so-called "load-dump situation").

This damaging overvoltage of limited duration comes about when a current control element 6 included in the controller 4 is actually inhibited as a result of a voltage rise sensed simultaneously at the adjacent terminal D+ by a voltage registering arrangement 7. Thus, in a manner which per se reduces terminal voltages, the controller 4 no longer feeds excitation current into the excitation winding 5. The excitation current which flowed immediately before through the excitation winding 5 cannot drop suddenly to zero but instead is maintained for a period via a free-wheeling valve 8 required for reasons of insulation protection, or decays only gradually. To this extent, there is a delay of the reduction of the magnetic excitation and thus an undesired support and prolongation of the overvoltage pulse. This overvoltage pulse can thus last, for example, for 300 ms and at the same time reach up to 200 volts with an equivalent internal resistance of only 2 ohms.

It is therefore an object of the present invention to provide a device for limiting the terminal voltage in an alternator, which ensures with simple means the protection of connected loads from overvoltage surges due to load dumping.

This and other objects are achieved by the present invention which provides an arrangement for limiting the terminal voltage in an alternator having a fixed stator winding acting on rectifiers, an excitation winding which rotates with the alternator rotor, a controller and a first slip ring contact which load the excitation winding with excitation current as a function of the magnitude of a delivered voltage, and at least one free-wheeling valve which is conductive during a controller-side interruption of the excitation current and is connected in parallel with the excitation winding. The arrangement comprises an auxiliary winding on the rotor, this auxiliary winding continuing the excitation winding with the same direction of winding, with the auxiliary winding and the excitation winding being connected at a first connection point. A second slip ring contact operatively connects the first connection point to a machine terminal supplying excitation current. A zener diode is connected in series with the auxiliary winding, and a third slip ring contact operatively connects the auxiliary winding to a ground terminal of the alternator or of the controller.

The device according to an embodiment of the present invention in an alternator permits a rapid field degradation by defined and rapid conversion of the magnetizing energy of the excitation circuit into heat. At the same time, the overvoltage peak is utilized to deliver a current for field compensation of the excitation winding with the effect of reducing the induced voltage.

Other objects, advantages and novel features of the present invention will become apparent from the following detailed description of the invention when considered in conjunction with the accompanying drawings.

DETAILED DESCRIPTION OF THE DRAWINGS

Figure 1:
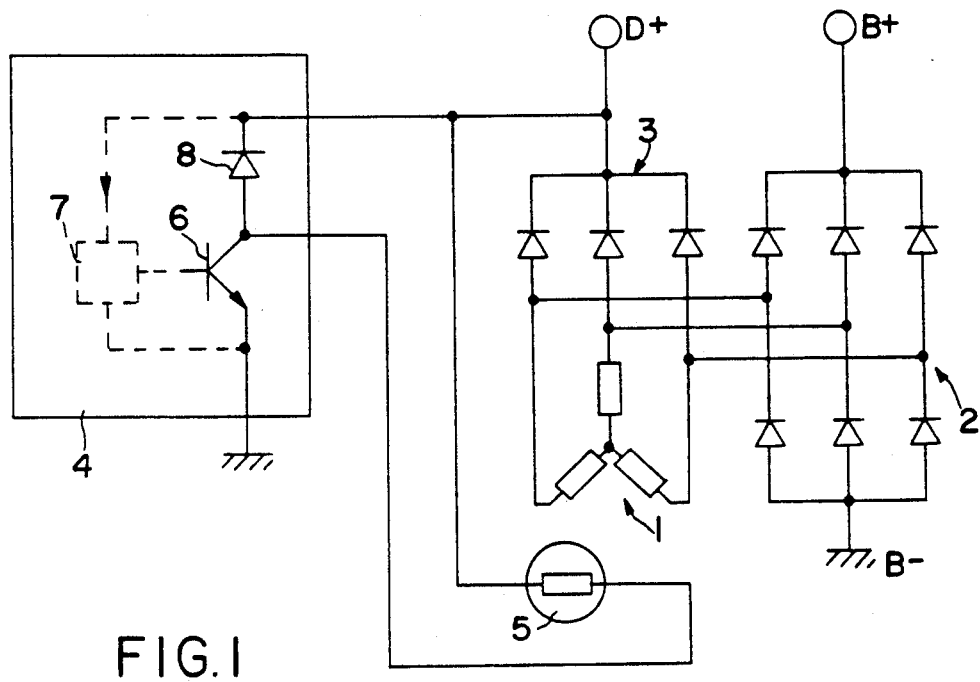
FIG. 1 shows the functional circuit diagram of a conventional alternator with rectifier and controller.

As shown in FIGS. 2a–d, the stator winding 1, the rectifier elements 2 and 3, the controller 4 with a component 6 controlling the excitation current, a voltage registration arrangement 7 driving said component and a free-wheeling valve 8 correspond to those from the prior art. However, according to the present invention the rotor 5.3 has two windings, namely the actual excitation or main winding 5.1 and an auxiliary winding 5.2 which are connected in series with respect to their direction of winding and, thus, appear as an inductance with tap. The three-pole rotor winding structure of FIGS. 2a-d is connected via three (instead of the customary two) slip rings (not illustrated) to the other parts of the device fixed to the stator.

The excitation or main winding 5.1 is supplied with current in a known manner from the terminal D+ and via a controllable ground path of the controller 4 and is bridged by a free-wheeling valve 8. The auxiliary winding 5.2, which is connected in series continuing the direction of winding of the excitation or main winding 5.1, is connected to the terminal D+ and to the negative battery pole B— or to the vehicle ground via a zener diode 9 poled in the blocking or zener direction.

The zener voltage of the zener diode 9 is dimensioned such that it is, on the one hand, larger than the nominal voltage of the terminal D+ with respect to ground including a still tolerable voltage increase, but, on the other hand, is below the region of overvoltage at the terminal D+ which always causes damage. Thus, the zener voltage is also below a corresponding overvoltage at the terminal B+ which conducts the main current.

The arrangement according to the present invention functions as follows. As long as no inadmissibly high voltage with respect to the vehicle ground occurs at the terminal D+, the zener diode 9 and the auxiliary winding 5.2 are currentless. If, on the other hand, the voltage at the terminal D+ exceeds the zener voltage, a compensation current flows through the auxiliary winding 5.2 with a direction of flow opposite to the current in the excitation or main winding 5.1. Since the opposing flows momentarily cancel one another out or weaken one another, the part of the magnetic flux which is due to a through-flow of current is canceled out or weakened, this magnetic flux being established in total by the rotor. The momentary weakening of the magnetic field brings about an immediate weakening or restriction of the voltage delivered at the terminal D+ to approximately the zener voltage of the zener diode 9. There is correspondingly a limitation of the voltage at the terminal B+ which is unloaded or separated from the load, irrespective of whether a current flowing through the excitation or main winding 5.1 of the rotor flows via the free-wheeling valve 8 or the component 6 which controls the excitation current.

Since load-dump states only have a limited duration (order of magnitude of 100 to 400 ms) and the thermal time constant of the entire rotor winding with sealing compound is large in comparison, the auxiliary winding 5.2 can be manufactured from substantially thinner wire than the excitation or main winding, as a result of which the winding space additionally required for it turns out to be advantageously small. The slip ring contact which provides the auxiliary winding with current also need not be designed to be capable of conducting constant current since current only flows through it in the presence of a load-dump state for the above-mentioned short period. The same applies for the dimensioning of the cooling capacity which may be provided for the zener diode 9 to dissipate the heat into which a part of the magnetic energy is converted.

Figure 2A:
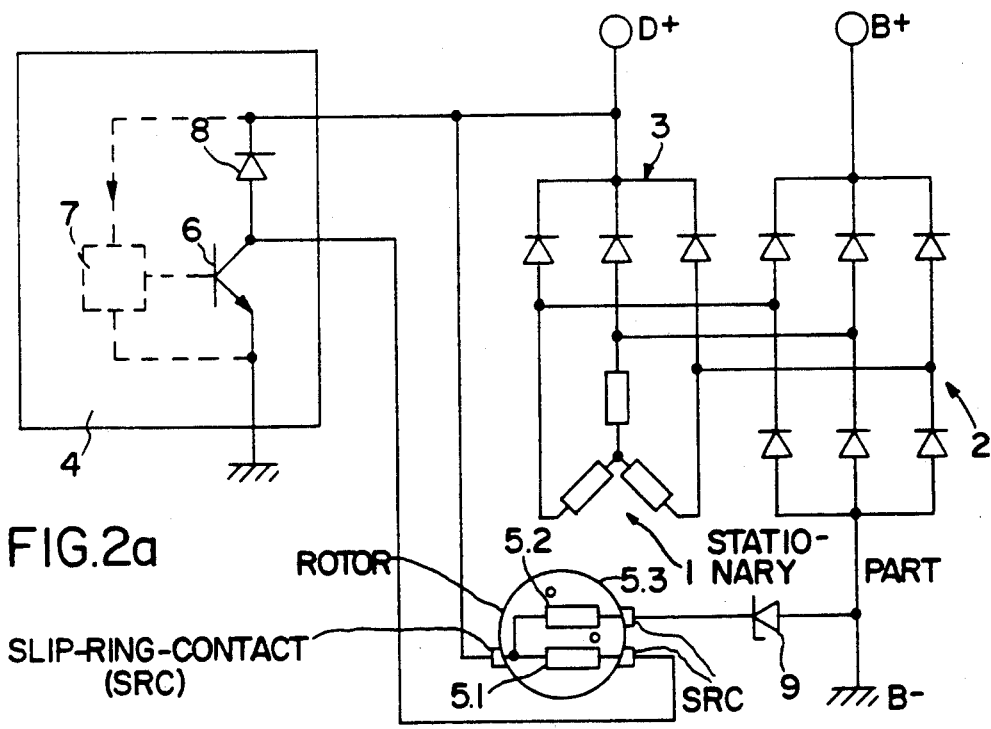
FIG. 2a shows the functional circuit diagram of an alternator having a device constructed according to an embodiment of the present invention.
Figure 2B:
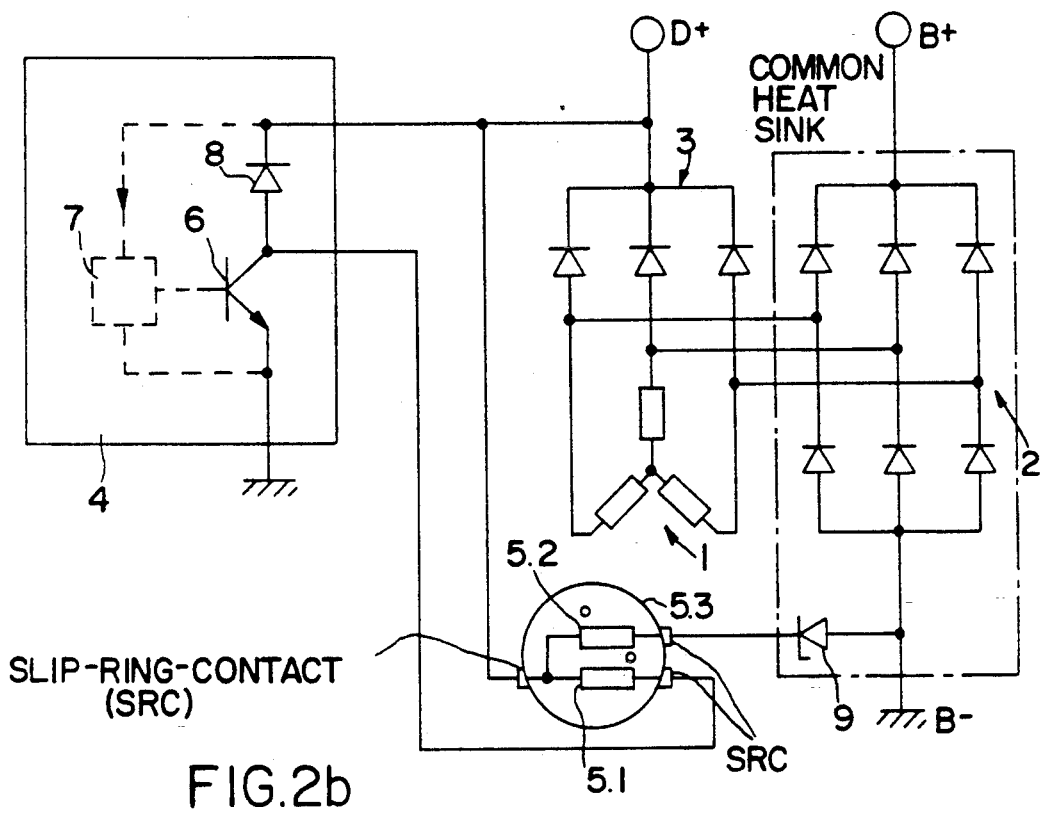
FIG. 2b shows the functional circuit diagram of an alternator having a device constructed according to an alterative of the present invention.
Figure 2C:
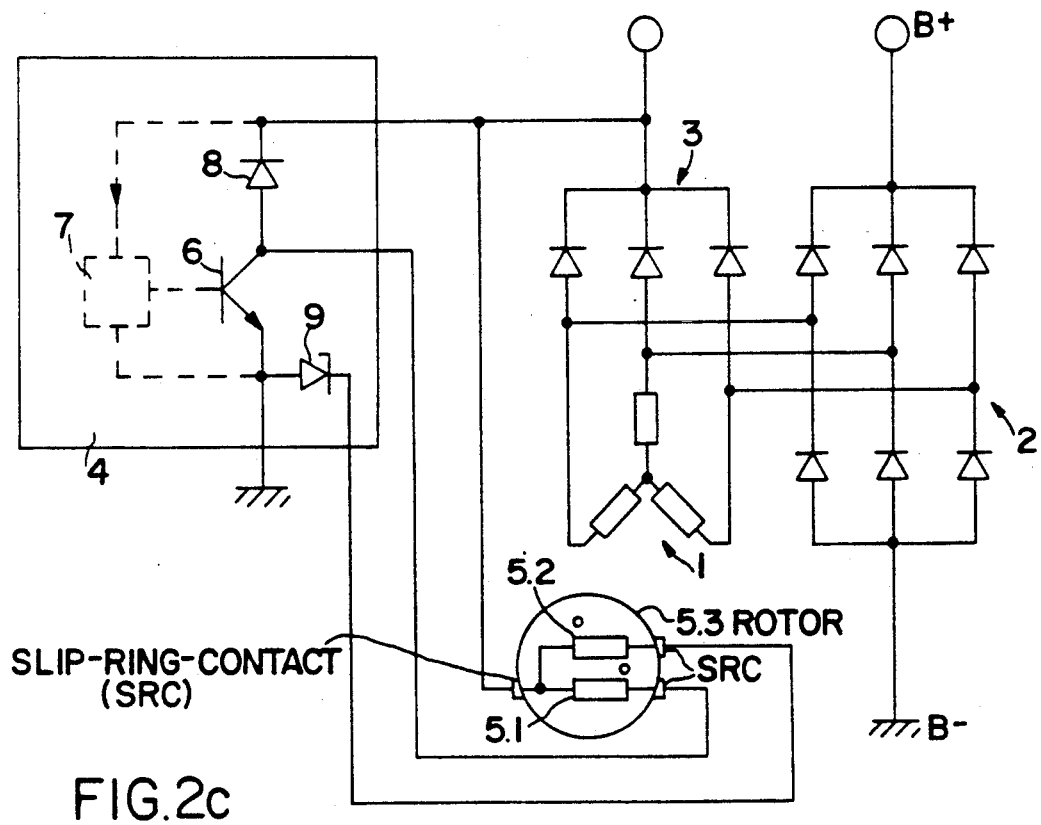
FIG. 2c shows the functional circuit diagram of an alternator having a device constructed according to another alternative of the present invention.
Figure 2D:
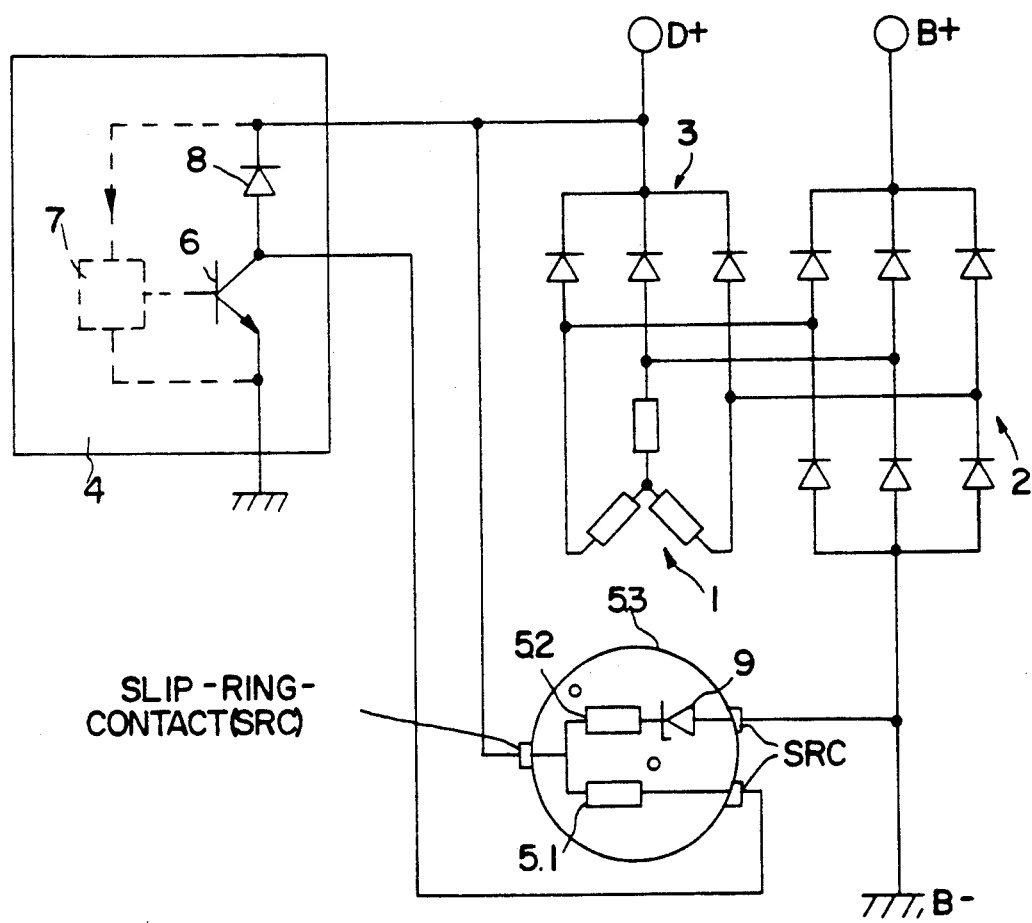
FIG. 2d shows the functional circuit diagram of an alternator having a device constructed according to still another alternative of the present invention.

According to the present invention, the zener diode 9 can be arranged on..or in the fixed part (FIG. 2a) or in the rotor of the alternator (FIG. 2d). In preferred embodiments, it is mounted on/in the fixed part on/in a cooling element also provided for one or more rectifier valves (FIG. 2b). In other embodiments, if the zener diode 9 is mounted on/in the rotor, the zener diode 9 is mounted in the region of a component through which cooling air flows, particularly in a forced manner, for example in good thermal contact with a heat-conducting cooling rib red ring or the like.

The device according to the present invention for limiting the thermal voltage in an alternator thus gives rise to little outlay and costs and can be easily integrated into conventional machines. Since the parts which are required in addition to those of a conventional dynamo are only loaded at the moment of a load-dump state, and otherwise are not loaded, the device according to the present invention is very reliable and brings about a high degree of availability of alternators equipped with it.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for limiting the terminal voltage in an alternator having a fixed stator winding acting on rectifiers, an excitation winding which rotates with the alternator rotor, a first slip ring contact, and a controller which loads the excitation winding with excitation current as a function of the magnitude of a delivered voltage, and at least one free-wheeling valve which is conductive during a controller-side interruption of the excitation current and is connected in parallel with the excitation winding, the arrangement comprising:
   an auxiliary winding on the rotor, said auxiliary winding being a continuation of the excitation winding in the same direction of winding, with the auxiliary winding and the excitation winding being connected at a first connection point;
   a second slip ring contact that operatively connects the first connection point to a machine terminal supplying the excitation current;
   a zener diode connected in series with the auxiliary winding; and
   a third slip ring contact that operatively connects the auxiliary winding via said zener diode to a ground terminal of the alternator.

2. The arrangement according to claim 1, wherein the zener diode is mounted in a stationary part of the alternator.

3. The arrangement according to claim 2, wherein the zener diode is mounted together with at least one of a plurality of rectifier valves on a common cooling element.

4. The arrangement according to claim 1, wherein the zener diode is a component contained in the controller in a single housing.

5. The arrangement according to claim 1, wherein the zener diode is mounted on the rotor of the alternator.

6. The arrangement according to claim 2, wherein the zener diode is mounted together with at least one of a plurality of rectifier valves in a common cooling element.

7. The arrangement according to claim 1, wherein the zener diode is mounted in the rotor of the alternator.

8. An arrangement for limiting the terminal voltage in an alternator having a fixed stator winding acting on rectifiers, an excitation winding which rotates with the alternator rotor, a first slip ring contact, and a controller which loads the excitation winding with excitation current as a function of the magnitude of a delivered voltage, and at least one free-wheeling valve which is conductive during a controller-side interruption of the excitation current and is connected in parallel with the excitation winding, the arrangement comprising:

- an auxiliary winding on the rotor, said auxiliary winding being a continuation of the excitation winding in the same direction of winding, with the auxiliary winding and the excitation winding being connected at a first connection point;
- a second slip ring contact that operatively connects the first connection point to a machine terminal supplying the excitation current;
- a zener diode connected in series with the auxiliary winding; and
- a third slip ring contact that operatively connects the auxiliary winding via said zener diode to a ground terminal of the controller.

9. The arrangement according to claim 8, wherein the zener diode is mounted in a stationary part of the alternator.

10. The arrangement according to claim 9, wherein the zener diode is mounted together with at least one of a plurality of rectifier valves on a common cooling element.

11. The arrangement according to claim 8, wherein the zener diode is a component contained in the controller in a single housing.

12. The arrangement according to claim 8, wherein the zener diode is mounted on the rotor of the alternator.

13. The arrangement according to claim 9, wherein the zener diode is mounted together with at least one of a plurality of rectifier valves in a common cooling element.

14. The arrangement according to claim 8, wherein the zener diode is mounted in the rotor of the alternator.

* * * * *